United States Patent
Robinson et al.

(10) Patent No.: US 8,384,806 B2
(45) Date of Patent: Feb. 26, 2013

(54) BLACK LEVEL CONTROL APPARATUS AND METHOD

(75) Inventors: Christopher Paul Robinson, Langdon Hills (GB); Timothy Nicholas Dammery, Leigh-on-Sea (GB)

(73) Assignee: Keymed (Medical & Industrial Equipment) Ltd., Essex (GB)

( * ) Notice: Subject to any disclaimer, the term of this patent is extended or adjusted under 35 U.S.C. 154(b) by 457 days.

(21) Appl. No.: 12/247,306

(22) Filed: Oct. 8, 2008

(65) Prior Publication Data

US 2009/0102952 A1 Apr. 23, 2009

(30) Foreign Application Priority Data

Oct. 8, 2007 (GB) .................................. 0719606.6

(51) Int. Cl.
H04N 9/64 (2006.01)

(52) U.S. Cl. ........................................ 348/243

(58) Field of Classification Search .......... 348/243–245, 348/257

See application file for complete search history.

(56) References Cited

U.S. PATENT DOCUMENTS

| 5,070,414 | A | 12/1991 | Tsutsumi | |
|---|---|---|---|---|
| 6,750,910 | B1 | 6/2004 | Bilhan | |
| 6,791,607 | B1 * | 9/2004 | Bilhan et al. | 348/243 |
| 6,829,007 | B1 * | 12/2004 | Bilhan et al. | 348/243 |
| 7,084,911 | B1 | 8/2006 | Lee et al. | |
| 7,084,912 | B2 * | 8/2006 | Chieh | 348/245 |
| 7,432,965 | B2 * | 10/2008 | Mori | 348/243 |
| 7,551,212 | B2 * | 6/2009 | Ise | 348/243 |
| 2004/0189839 | A1 | 9/2004 | McDermott | |
| 2007/0139539 | A1 * | 6/2007 | Ohara et al. | 348/243 |

FOREIGN PATENT DOCUMENTS

| EP | 1237353 A1 | 9/2002 |
|---|---|---|
| FR | 2844418 A1 | 3/2004 |

OTHER PUBLICATIONS

UK Search Report for GB 0719606.6 dated May 7, 2008 (3 pgs).
Extended European Search Report dated Feb. 24, 2012 for Application No. EP 08 253 273.0.

* cited by examiner

*Primary Examiner* — Timothy J Henn
(74) *Attorney, Agent, or Firm* — Smith, Gambrell and Russell, LLP

(57) ABSTRACT

A black level control apparatus and method, particularly for a high-speed video camera (8). The apparatus (10,100) comprises an image signal channel (30,130) for receiving an image signal having a black level from an image sensing device (22,122); a black level sensing device (24,124) for generating a black level signal; a black level signal channel (40,140), independent from the image signal channel, for receiving the black level signal from the black level sensing device; a black level controller (60,160) for receiving an input signal based on the black level signal, measuring a difference between the input signal and a reference signal, generating a control signal based on the difference, outputting the control signal to the image signal channel to adjust the black level of the image signal, and feeding the control signal to the black level signal channel, such that the input signal is based on the black level signal and the control signal.

20 Claims, 3 Drawing Sheets

BLACK LEVEL CONTROL APPARATUS AND METHOD

FIELD OF THE INVENTION

This invention relates to a black level control apparatus and method; in particular, but not exclusively, for an electronic camera, especially a high-speed video camera.

BACKGROUND OF THE INVENTION

The term, black level, may be used to refer i) to the display input signal amplitude required for an image display device to render black in a displayed image (i.e., zero illumination to be provided by the device), or ii) to the sensor output signal amplitude generated by an image sensor when the output signal corresponds to a black region of a scene being captured (i.e., zero illumination received by the sensor). In this specification, the term is used principally to refer to the sensor black level, unless otherwise stated or clear from the context.

Image display devices are typically arranged with a definition that a display input signal of zero amplitude (or a fixed reference voltage, in the case of NTSC) will result in a black displayed image. This is typically also the case with image/video recording devices and digitising systems. Most image sensors, however, have no such definition, so that the sensor output signal is not necessarily of zero amplitude when all light is excluded from the sensor. The amplitude of the sensor output signal may be non-zero to a degree which is affected mainly by the design of the sensor, by manufacturing variations between sensors of the same design, and by temperature of operation. Coupling the sensor output signal to an image display device could therefore result in black regions of a scene being represented by an undefined and most likely non-zero luminance (brightness) in the displayed image (e.g., appearing as grey, instead of black). It is accordingly important for an electronic camera to be able to normalise the sensor output signal; that is, to determine and control the black level so that the display input signal from a camera has zero amplitude (or a fixed reference voltage) to represent black.

The sensing array in an electronic image sensor typically represents the image by producing a complex electrical waveform. Normally, the waveform is sampled by the processing circuitry in synchrony with the pixel clock, to reduce contributions to the signal which do not originate from the scene being captured. The waveform thus typically provides a voltage which varies with the pattern and intensity of light falling on the sensor. Without black level control, the waveform will not have a fixed voltage level to represent black.

The most common technique for providing black level control involves masking a number of pixels in the sensing array such that they have a greatly reduced sensitivity to light. The signal from these pixels is read out of the array to provide a voltage amplitude which is deemed to correspond to the voltage amplitude of a non-illuminated pixel in the active region of the image sensor. Accordingly, the DC voltage level of the waveform from the active region of the sensor is shifted up or down by the voltage amplitude read out from the masked region of the sensor. The voltage amplitude representing black may thereby be adjusted to zero (a fixed, non-zero value may alternatively be chosen).

In one known technique, the information from the masked region may be read out at any suitable stage of the read-out from the array (i.e. before or after all, or part, of the information from the active region). The information from both regions is thereby carried in the same waveform. The black portion of the waveform, from the masked region, is read by an electronic clamp circuit for providing the adjustment to the DC voltage level of the waveform. In this way, the remainder of the waveform is referenced to a fixed black level voltage.

The clamp circuit comprises a driving amplifier and a capacitor, both in series with the video signal processing line, and a clamp switch, which is connected to a black level reference voltage source, which may or may not be ground (i.e. 0V). The clamp switch is arranged to short-circuit the video signal to the reference voltage at times when the video signal passing the clamp switch is the black portion of the waveform. During this clamping step, the capacitor is charged, or discharged, in dependence upon the voltage level of the black portion. When the clamp switch turns off, to remove the short-circuit, the potential difference across the capacitor is considered to provide the DC offset voltage between the actual image sensor output signal black level amplitude and the desired reference amplitude. Operation of the clamp circuit relies on a further amplifier, provided on the signal processing line downstream of the clamp switch, drawing little or no DC current, so that the clamp capacitor is only negligibly discharged before the next clamping step. The clamp circuit continually adjusts the DC voltage level of the sensor output signal, to take account of variations in the sensor black level with time and temperature, at a rate typically in the range from 50 Hz to tens of kilohertz (e.g., if the clamping rate is at line frequency, this is 50 Hz for PAL and 60 Hz for NTSC; if picture frequency, this is 15.625 kHz for PAL and NTSC).

The above technique suffers from a number of problems. Firstly, the clamp circuit operation is reasonably imprecise, as indicated above. Secondly, while the masked region of the sensor array has a greatly reduced sensitivity to light, it is typically not opaque (i.e., it does not have zero sensitivity). Thirdly, it is not appropriate or preferable to control the black level in the above way for some image sensor architectures. In particular, in high-speed video cameras, the image sensor may have multiple output channels for different regions of the sensor array. Since it is desirable to achieve fast read-out of information from the array, if a respective clamp circuit of the above type were provided on each output channel, a significant proportion of the overall read-out time would be spent reading black pixels, when information from the active pixel regions could be read.

In FR-A1-2,844,418, an image embedding process has a first image source and a second image source which are combined in an image output. The first source has a black level generator different to that of the image. The first image black level signal is detected. A switch provides combinations of the two images with the detected black level, and a second combination without the black level.

U.S. Pat. No. 5,070,414 relates to an image reader comprising a line sensor having an array of photoelectric conversion elements, the photoelectric conversion elements being selectively shaded to provide light-shielded pixels for outputting light-shielded signals and effective pixels which are not shaded for outputting effective pixel signals. Analogue-to-digital conversion means convert the light-shielded signals to digital light-shielded signals, which are then held by holding means. Image signal producing means correct a first signal corresponding to the effective pixel signals in accordance with a second signal corresponding to the digital light-shielded signals held by the holding means and generate an image signal.

EP-A1-1,237,353 relates to an image sensor which includes an active pixel area for image capture, one or more black pixel areas disposed in a pre-determined, significant spaced apart distance from the active pixel area, and a light shield to prevent light from illuminating the black pixel areas.

There is a need for an improved or alternative black level control technique. The invention aims to provide such a black level control technique.

SUMMARY OF THE INVENTION

In one aspect of the invention, there is provided a black level control apparatus for controlling the black level of an image signal from an image sensing device, the apparatus comprising: an image signal channel for receiving an image signal from an image sensing device, the image signal having a black level; a black level sensing device for generating a black level signal; a black level signal channel for receiving the black level signal from the black level sensing device, the black level signal channel being independent from the image signal channel; a black level controller for receiving an input signal based on the black level signal, measuring a difference between the input signal and a reference signal, generating a control signal based on the difference, and outputting the control signal to the image signal channel to adjust the black level of the image signal, and feeding the control signal back to the black level signal channel, such that the input signal is based on the black level signal and the control signal.

With a dedicated black level sensing device, it is no longer necessary to rely on switching the image signal (to ground) when a black portion is being read. Instead, a black portion, from the black level sensing device, may be read at any desired time. Furthermore, it is not necessary to interrupt or delay the readout of the image signal from an image sensing device, as this may be read out simultaneously.

The control signal is fed into a black level signal channel, so that the black level control apparatus may operate as a closed-loop, feed back system to continually adjust the control signal.

Preferably, the black level sensing device is reset independently of the image sensing device. This has the benefit of allowing the shutter period of the black level sensing device to be different from the shutter period of the image sensing device. In particular, the black level sensing device may have a shorter shutter period, for a shorter integration time, so that the sensitivity of the black level sensing device does not rely solely on the opacity of the mask, since the short shutter period will reduce the effect of light which is inadvertently detected per shutter period.

Preferably, the control signal is added to the image signal channel and the black level signal channel as an analogue signal, upstream of any signal processing stages. Preferably, the processing stages are the same for the image signal channel and the black level signal channel, so that system effects are reduced or avoided. The use of differential signalling in the processing stages and/or the use of instrumentation amplifiers can also help to cancel or reduce noise.

Preferably, the reference signal is determined by calibrating the image signal to a desired black level, using a calibration control signal from the controller, and applying the calibration control signal to the black level signal and storing the resulting black level input signal received by the controller as the reference signal. In this way, by controlling the black level signal using the reference signal during normal operation and applying the control signal so required to the image signal, the black level of the image signal can be adjusted to or kept at the desired black level.

In imaging systems employing more than one image sensing device, or a single image sensing device divided into multiple regions, a respective black level control apparatus may be provided for each image sensing device or region thereof.

Preferably, the black level control apparatus is employed in an electronic camera; in particular, in a high-speed video camera.

In another aspect of the invention, there is provided a method of controlling the black level of an image signal from an image sensing device, the method comprising the steps of: monitoring at a black level controller a black level input signal based on a black level signal from a black level sensing device, wherein the black level sensing device is independent of the image sensing device; generating at the black level controller a control signal based on a difference between the black level input signal and a reference signal; adding the control signal to image signal to adjust the black level of the image signal; and adding the control signal to the black level signal.

Other preferred features and advantages of the invention are set out in the description and in the dependent claims, which are appended hereto.

BRIEF DESCRIPTION OF THE DRAWINGS

The invention may be put into practice in a number of ways and some embodiments will now be described, by way of non-limiting example only, with reference to the following figures, in which.

DESCRIPTION OF A PREFERRED EMBODIMENT

Figure 1:
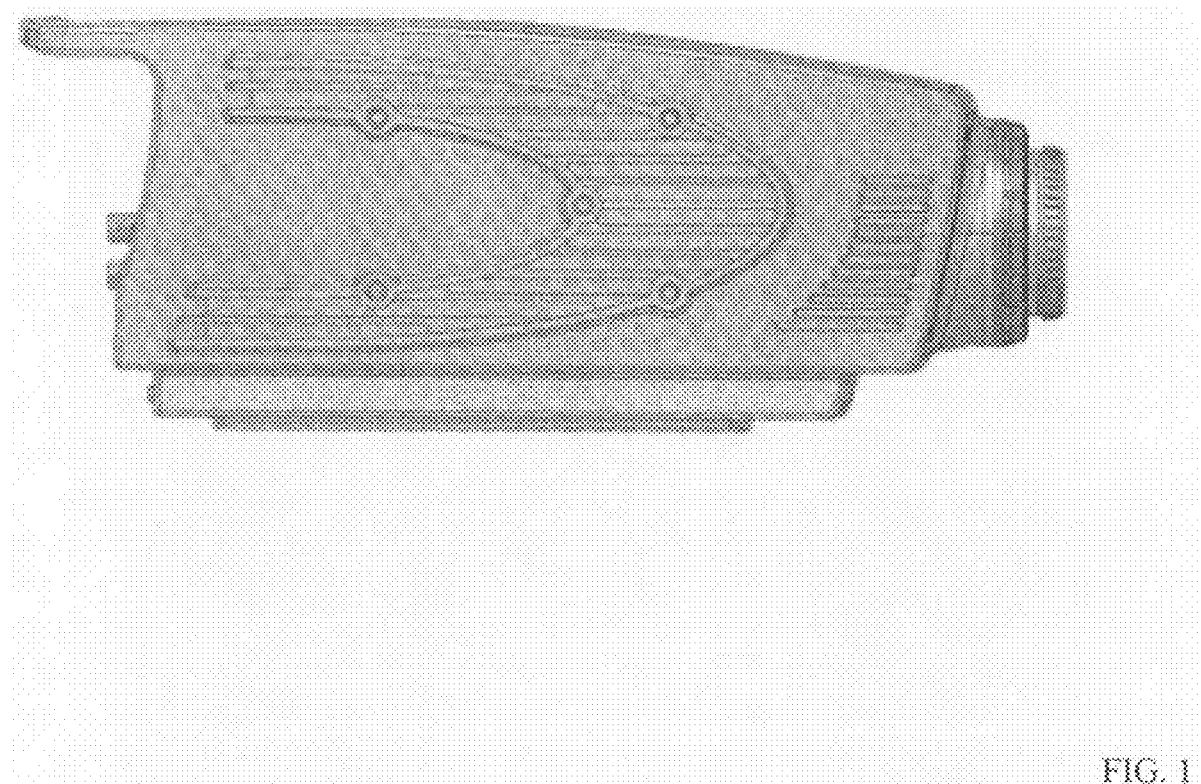
FIG. 1 shows a side view of an electronic camera according to one embodiment of the invention.

Referring to FIG. 1, there is shown an electronic camera 8, in accordance with one embodiment of the invention. The camera 8 has an optical assembly (not shown) for receiving and focusing light onto an image sensor (also not shown) and a processing assembly for processing the resulting image information. The camera's output may be to a display device, a recording/storage device, or to its own memory.

In use, the camera 8 is directed towards a scene to be captured. Light from one or more objects in the scene is focused onto the image sensor of the camera by the optical assembly. An image of the scene is thereby formed at the sensor, which generates an image signal representative thereof. The image signal may then undergo various image processing steps, including black level control.

Figure 2:
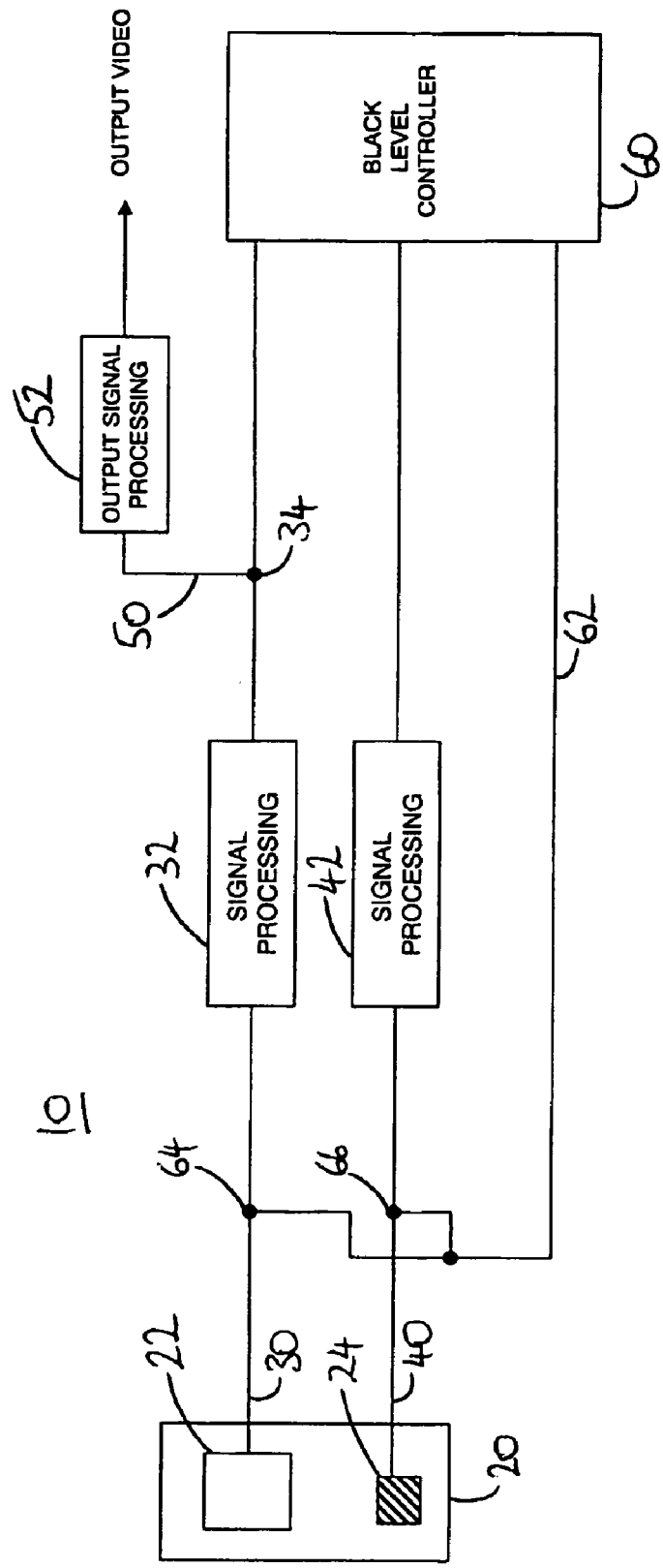
FIG. 2 shows schematically a black level control arrangement according to one embodiment of the invention.

Referring to FIG. 2, there is shown, highly schematically, a black level control arrangement 10 according to one embodiment of the invention. A sensor 20 comprises an image sensor portion 22 and a separate black level sensor portion 24. The black level sensor portion 24 employs the same type of sensing elements as the image sensor portion 22, except that the black level sensor portion is masked to reduce its light sensitivity. The sensor portions 22, 24 have separate and independent channels 30, 40 for receiving an image output signal and a black level output signal respectively.

The image signal channel 30 is connected via signal processing 32 to a node 34 with an output video signal channel 50. The signal processing 32 provides analogue processing to the image signal, to generate a digital image signal, typically by means of amplification, sampling and A-to-D conversion, as will be understood. On the output video signal channel 50, output signal processing 52 provides digital processing to the digital image signal, to generate a video output signal for supply to a display device or recording device. Without black level control, the video output signal may not represent black regions of the image correctly for the display or recording device.

The black level signal channel 40 is connected via signal processing 42, identical to signal processing 32, to a black level controller 60. The controller 60 has a control signal channel 62 which is connected to a node 64 with the image signal channel 30 and to a node 66 with the black level signal channel 40. Both nodes 64, 66 are upstream of the signal processing 32, 42. The controller 60 may comprise a D-to-A converter, or one may be provided on the control signal channel 62, to ensure that the signals supplied to the nodes 64, 66 are analogue signals.

In use, the black level controller 60 stores a reference signal corresponding to a black level input signal which is received by the controller from the black level signal channel 40 when the video output signal represents black regions of an image in a desired way (e.g. as 0V in the signal), under calibration conditions. The black level sensor portion 24, being masked, outputs a black level signal which is the signal generated by non-illuminated sensing elements under the present operating conditions (e.g. temperature). The black level signal is processed to generate a black level input signal for the controller 60. The controller 60 compares the black level input signal with the reference signal and generates a control signal based on the difference. The extent of the difference indicates how far off the desired black level value of the black level signal from the black level sensor portion 24 is, and, by extension, how far off the image signal from the image sensor portion 22 is. Accordingly, the control signal is added to the image signal, along control signal channel 62 and at node 64, to adjust the DC level of the image signal up or down, so that the desired black level is obtained.

The control signal is also added to the black level signal, at node 66, to shift the DC level of the black level signal up or down in the same manner. This provides a closed-loop, feedback system, which aims to bring the control signal to a substantially constant value, as the black level sensor portion 24 continues to generate a black level signal which is expected to vary only slowly with time.

Figure 3:
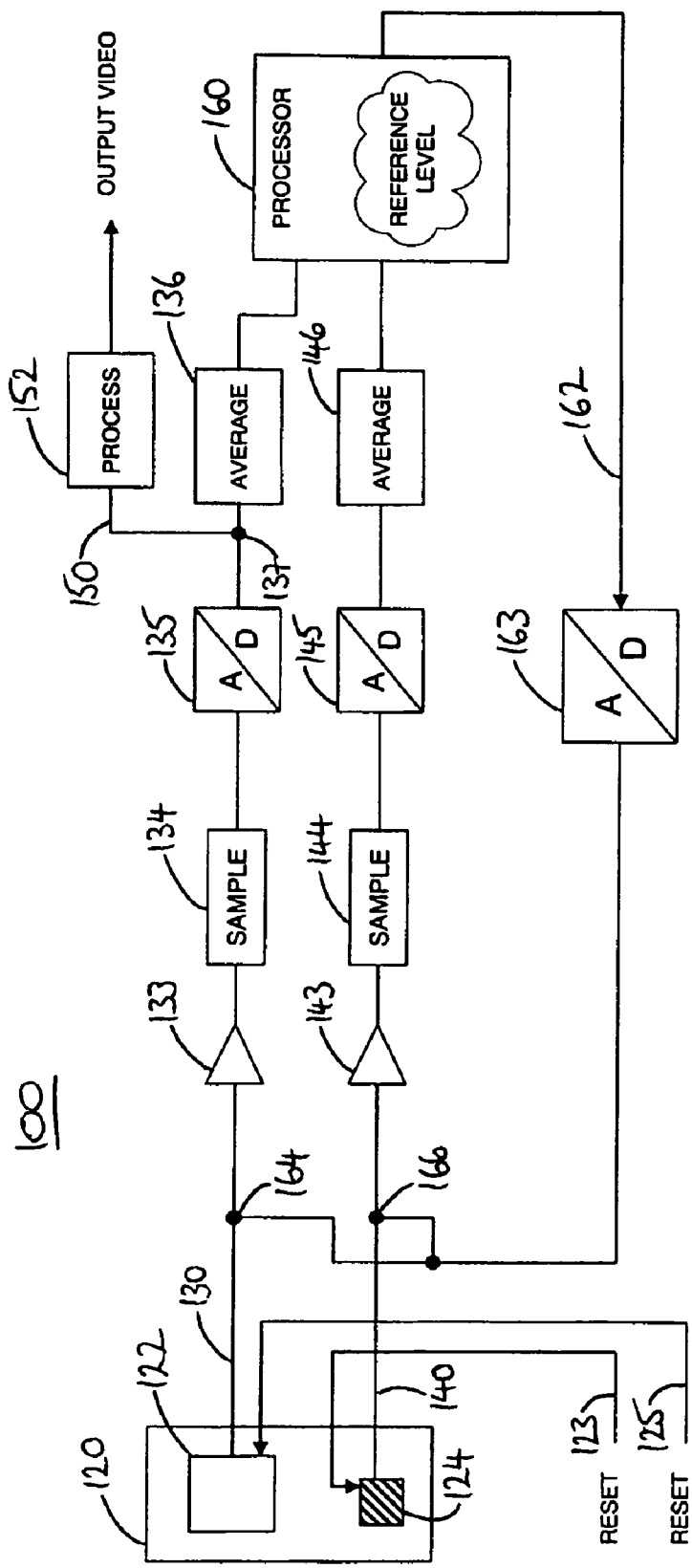
FIG. 3 shows schematically a black level control arrangement according to another embodiment of the invention.

Referring to FIG. 3, there is shown schematically a black level control arrangement 100 in accordance with another embodiment of the invention. A sensor 120 comprises an image sensor portion 122 for generating an image signal in response to light falling thereon and a separate black level sensor portion 124 for generating a black level signal under substantially zero illumination. The black level sensor portion 124 employs identical sensing elements to the image sensor portion 122, but with a number of modifications.

Firstly, the black level sensor portion 124 is masked to reduce its sensitivity to light. This may be achieved in any suitable manner, but is generally achieved by providing a metallic coating over the surface of the black level sensor portion (silicon) substrate. Preferably, the same metal which is used to provide conductive tracks on the sensor 120 is used, so that the coating procedure is simply an additional step in the photolithography process.

Secondly, the black level sensor portion 124 is provided with its own, dedicated output channel: black level signal channel 140. This is independent of the image signal channel 130, so that reading out from the sensor 120 for black level control purposes does not take up time for reading out image information. In particular, image signal reading out and black level signal reading out may be performed simultaneously.

Thirdly, the black level sensor portion 124 has a reset signal 123 which is separate and independent from the reset signal 125 for the image sensor portion 122. The black level sensor portion 124 may therefore have a different—in particular, shorter—shutter period from the image sensor portion 122. Providing a relatively short integration time in this way helps to reduce the sensitivity of the black level sensor portion to light even further, which is beneficial since the metallic coating typically does not provide an opaque mask.

Although the black level signal channel 140 is separate from the image signal channel 130, the processing of the respective signals along the channels is the same. The channels 130, 140 respectively comprise an amplifier 133, 143 for providing amplification as required, a sampler 134, 144 for sampling the analogue signals, an A-to-D converter 135, 145 for digitising the signal, and an averager 136, 146 for averaging the digital signal. It may be preferable in some cases to provide the amplification on the channels 130, 140 using instrumentation amplifiers, in view of their relatively high-precision, low-noise and low-drift characteristics. Additionally/alternatively, it may be preferable in some cases to combine the sampler and A-to-D converter on each channel 130, 140, since this will reduce the number of chips on the PCB and ease the drive requirements for the A-to-D converter input pins. Furthermore, where noise cancellation/reduction is a concern, it is preferable to operate the amplification, sampling and A-to-D conversion stages in differential signalling mode.

The image signal channel 130 and the black level signal channel 140 are connected between the image sensor portion 122 and the black level sensor portion 124, respectively, and a black level controller 160. The two channels 130, 140 are maintained separate from each other between their respective sensor portion 122, 124 and the controller 160. The channels 130, 140 are however DC coupled by a control signal, output from the controller 160 along control signal channel 162 and converted to an analogue signal by a D-to-A converter 163. The control signal is added to the channels at nodes 164, 166. The nodes 164, 166 are located upstream of the processing stages of the channels 130, 140, at which point the image signal and black level signal are (still) analogue signals. It will be noted that the same control signal channel 162 is arranged to supply the same control signal to both the image signal channel 120 and the black level signal channel 140.

A node 137 is located between the digitising processing 133-135 and the averager 136 and is connected to an output video signal channel 150. On this channel 150, output signal processing 152 provides digital processing to the digital image signal, to generate an output video signal for supply to a display device or recording device, or the like.

In use, the black level sensor portion 124 is set to have its shortest possible shutter time. This significantly reduces the sensitivity of the black level sensor portion 124 to light and is superior to relying only on the opacity of the mask, as in prior art arrangements. The black level sensor portion 124 generates a black level signal, which is processed along the black level signal channel 140 to provide an average value of the black level signal, as a black level input signal for the controller 160. The controller 160 compares the black level input signal with a predetermined reference signal and generates a control signal based on the difference. The extent of the difference indicates how far off the desired black level value of the black level signal from the black level sensor portion 124 is (due to variations in temperature of operation etc.), and, by extension, how far off the image signal from the image sensor portion 122 is.

The control signal is output from the controller 160, along control signal channel 162, converted to an analogue signal by the D-to-A converter 163, and fed back in to the black level signal channel 140 at the node 166. A closed-loop control system is thereby set up to minimise (or reduce) the difference between the average of the black level signal (the black level input signal) and the reference signal.

At the same time, the control signal is added to the image signal on the image signal channel 130, at the node 164. The DC level of the image signal is thereby shifted up or down, so that the desired black level is reached. In this way, the arrangement 100 uses a closed-loop control system to feed a correction signal into the open-loop image signal processing channel. The output video signal supplied along the output video signal channel is therefore provided with the desired black level, for example, to be presented correctly on a display device.

The reference signal used by the controller 160 is determined in a calibration procedure prior to normal operation. In this procedure, the sensor 120 is operated in complete darkness. The image signal generated by the image sensor portion 122 is processed along image signal channel 130 beyond the node 137, to the averager 136. In normal operation, the averager 136 is non-operational and the processed image signal—up until the node 137—is supplied to the output video signal channel 150 for further processing and output to a display/recording device. The averager 136 may be rendered non-operational either by switching it off, or by leaving it active but simply ignoring its output. The averager 136 provides an average value of the image signal, as an image input signal for the controller 160. The controller 160 generates a calibration control signal, which is D-to-A converted by DAC 163 on control signal channel 162 and fed back into the image signal channel 130 at the node 164. The calibration control signal is varied in this way until the image signal has a desired black level.

The desired black level and the manner of achieving it may be selected according to preference or application. For example, the desired black level may be a non-zero voltage, but will typically be 0V. The indicator of the black level of the image signal may be the average value output from the averager 136. However, since there tends to be a degree of variation in the output of different sensing elements in an array for a given illumination (including in this case, zero illumination, in complete darkness), it may be preferable to determine a proportion of the sensing elements whose output signal levels are closest to the desired black level and to provide a calibration control signal for shifting those signal levels to the desired black level. This would mean that the output signal levels of the remaining sensing elements would be adjusted by the same amount, albeit not sufficient an adjustment to bring those remaining signal levels all the way to the desired black level. In this case, a further adjustment may be made. A map of the variation in the sensing element outputs for a given illumination is first measured and then subtracted from the overall image, to remove the non-uniformities. This is called fixed-pattern noise correction.

Although, in principle, the variation of the calibration control signal and the judgment as to when the desired black level is reached could be performed manually/visually, it is much preferred to allow the arrangement 100 to operate as a closed-loop, feedback system. In this way, the desired black level is initially input to the controller 160 and the calibration control signal is varied and fed back to the node 164 and combined with the image signal until the signal received by the controller from the image signal channel 130 matches the desired black level.

In any case, once the desired black level of the image signal under calibration conditions is achieved, the calibration control signal is fed into the black level signal channel 140, at the node 166. The resulting black level input signal received by the controller 160 is stored as the reference signal for normal operation. In this way, ensuring that the black level input signal matches the reference signal and adding the control signal required to achieve this to the image signal will adjust the image signal so that any black portions of the waveform are at the desired black level for output to a display/recording device.

In some imaging systems, there may be a plurality of image sensor portions 122 provided as a tiled array. Alternatively, a single image sensor portion 122 may be divided into a number of independent or semi-independent image sensing regions. In such arrangements, the relationships between the black level signal and the image signals from the various portions/regions to vary. Accordingly, a black level control loop can be provided for each portion/region, so that each has an independent reference level. Calibration may be performed as above, ensuring that the desired black level for all of the portions/regions is the same value.

Many combinations, modifications, or alterations to the features of the above embodiments will be readily apparent to the skilled person and are intended to form part of the invention.

The invention claimed is:

1. A black level control apparatus for controlling the black level of an image signal from an image sensing device, the apparatus comprising:
   an image signal channel for receiving an image signal from an image sensing device, the image signal having a black level;
   a black level sensing device for generating a black level signal;
   a black level signal channel for receiving the black level signal from the black level sensing device, the black level signal channel being separate and distinct, without any overlap, from the image signal channel;
   a black level controller for receiving an input signal based on the black level signal, measuring a difference between the input signal and a reference signal, generating a control signal based on the difference, outputting the control signal to the image signal channel to adjust the black level of the image signal, and feeding the control signal back to the black level signal channel, such that the input signal is based on the black level signal and the control signal.

2. The apparatus of claim 1, wherein the black level sensing device comprises a reset controller for resetting the black level sensing device independently of an image sensing device.

3. The apparatus of claim 1, the black level controller further being for feeding the control signal to the image signal channel and/or the black level signal channel as an analogue signal.

4. The apparatus of claim 1, wherein the image signal channel and/or the black level signal channel comprises a respective differential signalling channel.

5. The apparatus of claim 1, wherein the image signal channel and/or the black level signal channel further comprises a respective instrumentation amplifier for amplifying the image signal or the black level signal respectively.

6. The apparatus of claim 1, wherein the image signal channel is connected to the black level controller for calibration of the image signal with a calibration control signal, under calibration conditions, and the reference signal is the input signal received by the black level controller when the control signal added to the black level signal is the calibration control signal.

7. A system comprising either a plurality of image sensors, each sensor comprising a respective image sensing device, or an image sensor comprising a plurality of image sensing devices, the system comprising a respective black level control apparatus according to claim 1 for each image sensing device.

8. An electronic camera comprising the apparatus of claim 1.

9. An electronic camera comprising the system of claim 7.

10. A high-speed video camera comprising the apparatus of claim 1.

11. A high-speed video camera comprising the system of claim 7.

12. A method of controlling the black level of an image signal from an image sensing device, the method comprising the steps of:
monitoring at a black level controller a black level input signal which is based on a black level signal output to a black level signal channel from a black level sensing device, wherein the black level signal channel is separate and distinct, without any overlap, from an image signal channel of the image sensing device;
generating at the black level controller a control signal based on a difference between the black level input signal and a reference signal;
adding the control signal to image signal to adjust the black level of the image signal; and
adding the control signal to the black level signal.

13. The method of claim 12, wherein the black level sensing device is reset independently of the image sensing device.

14. The method of claim 13, wherein the black level sensing device has a shorter shutter period than the image sensing device.

15. The method of claim 12, further comprising the step of processing the black level signal and the image signal separately, but in the same way, upstream of the black level controller.

16. The method of claim 15, wherein the control signal is added to the image signal and/or the black level signal before the processing step.

17. The method of claim 15, wherein the image signal and the black level control signal are processed in differential signalling mode.

18. The method of claim 12, further comprising the step of averaging the black level signal upstream of the black level controller.

19. The method of claim 12, further comprising the calibration steps of:
monitoring a calibration image input signal based on a calibration image signal from the image sensing device under calibration conditions;
generating a calibration control signal for adjusting the calibration image signal to a desired signal; and
adding the calibration control signal to the black level signal and storing the resulting calibration black level input signal as the reference signal.

20. The method of claim 12, wherein controlling the black level of an image signal from an image sensing device is carried out with the respective image sensing device of either a plurality of image sensors, each image sensor comprising a respective image sensing device, or an image sensor comprising a plurality of image sensing devices.

* * * * *